United States Patent
Küchen

(10) Patent No.: US 6,438,239 B1
(45) Date of Patent: Aug. 20, 2002

(54) PROCESS AND ARRANGEMENT OF MONITORING THE EFFECTIVENESS OF A SPRAY STREAM

(76) Inventor: Jörg Küchen, Eichendorffstr. 38, 52146 Würselen (DE)

(*) Notice: Subject to any disclaimer, the term of this patent is extended or adjusted under 35 U.S.C. 154(b) by 0 days.

(21) Appl. No.: 08/988,795

(22) Filed: Dec. 11, 1997

(30) Foreign Application Priority Data

Dec. 12, 1996 (DE) .......................... 196 51 702

(51) Int. Cl.$^7$ .......................... H03B 29/00; B67D 5/38
(52) U.S. Cl. .......................... 381/71.1; 427/10; 239/74
(58) Field of Search .......................... 381/56, 122, 71.1, 381/71.11, 94.7, 94.1; 340/603; 427/8, 10; 239/71, 73, 74

(56) References Cited

U.S. PATENT DOCUMENTS 4,806,931 A * 2/1989 Nelson .......................... 340/907
5,175,530 A * 12/1992 Eng .......................... 340/606
5,322,706 A * 6/1994 Merkel et al. .......................... 427/8

* cited by examiner

*Primary Examiner*—Vivian Chin
*Assistant Examiner*—Brian T. Pendleton
(74) *Attorney, Agent, or Firm*—Henry M. Feierreisen; Ursula B. Day

(57) ABSTRACT

A process of monitoring the function of a spray stream, includes the steps of determining a first signal commensurate with noise in proximity of the spray stream when exiting a spray gun, determining a second signal commensurate with noise in an environment further distant to the spray stream, separating from the first and second signals a wanted signal, and analyzing the wanted signal for evaluation of the effectiveness of the spray stream.

7 Claims, 1 Drawing Sheet

PROCESS AND ARRANGEMENT OF MONITORING THE EFFECTIVENESS OF A SPRAY STREAM

BACKGROUND OF THE INVENTION

The present invention generally refers to a process and arrangement of monitoring the effectiveness of a spray stream.

German Pat. No. 41 41 665 A1 describes a process of analyzing a spray stream which process is based on directing a spray content onto a measuring surface of a material exhibiting low heat capacity so that the measuring surface cools down in dependence on the amount of impacting spray content. Through comparison of the temperature profile before and after spraying the content on the measuring surface, the effectiveness of the spray stream can be determined.

It will be understood that the term "spray stream" should be so interpreted in the following description as to encompass every fluid stream exiting a nozzle or other outlet unit, such a liquid flow, gas flow or particle flow.

A problem encountered in all nozzles is the possibility of a complete or at least partial clogging of the nozzle by deposits in the nozzle area or by coarse particles in the fluid flow. Moreover, the nozzle may wear out and gradually adversely affect the operativeness thereof.

In particular, in connection with painting plants, the use of varnish that is typically difficult to remove leads rather rapidly to a contamination of the optical sensory mechanism of conventional light barrier systems. Thus, especially when using mobile systems, such as painting robots, the components of the conventional optical sensory mechanism should be periodically cleaned, and re-adjusted, and a prophylactic replacement of the varnishing nozzle cannot be avoided.

SUMMARY OF THE INVENTION

It is thus an object of the present invention to provide an improved process of monitoring the effectiveness of a spray stream, obviating the afore-stated drawbacks.

In particular, it is an object of the present invention to provide an improved monitoring process that enables a qualitative evaluation of the effectiveness of a spray stream, while remaining unaffected by contamination.

It is still another object of the present invention to provide an improved monitoring process which is able to detect execution of a spray action and to determine the quality of the spray action, thereby allowing the user to replace and clean the nozzle or outlet unit in due course before the spray action deteriorates.

It is yet another object of the present invention to provide an improved arrangement for carrying out the monitoring process according to the present invention.

These objects, and others which will become apparent hereinafter, are attained in accordance with the present invention by determining a first signal commensurate with noise detected in proximity of the spray stream, determining a second signal commensurate with noise detected in an environment further distant to the spray stream, separating from the first and second signals a wanted signal, and analyzing the wanted signal for evaluation of the effectiveness of the spray stream.

Preferably, the determination of the noise level in close proximity of the spray stream and the noise level in the further distant area thereof is carried out by utilizing sensors, preferably two microphones. By utilizing microphones, the monitoring process according to the present invention is much less susceptible to contaminants or pollutants than optical sensors such as light barriers. The determination of both these noise levels results in an elimination especially of interfering signals as a consequence of loud ambient noise. Moreover, the application of acoustic sensory analysis results in a highly accurate determination of the effectiveness of a spray stream because slight variations of the nozzle function leads to a significant variation in frequency and amplitude of the determined sound waves. Application of acoustic sensory analysis also allows a monitoring of the spray pressure.

According to another feature of the present invention, one of the microphones that is positioned in vicinity of the spray stream exhibits a directional characteristic so as to determine useful and interfering signals, while the other one of the microphones, positioned slightly further distant to the spray stream, exhibits an omnidirectional characteristic to determine mainly any unwanted or interfering signal. Thus, a comparison of the determined sound levels enables a separation of the wanted signal which is substantially freed from the interfering signal.

Preferably, the noise levels may be digitized, and the wanted signal can be separated by a compensation circuit, whereby the noise levels measured by the microphones are transmitted separately to an analog-to-digital converter, and the outputted digitized signals are fed to the compensation circuit for determination of the wanted signal. Suitably, the compensation circuit includes e.g. a linear-phased finite impulse response filter ("FIR filter"). In the event, disturbing noise varies, it may be suitable to incorporate an iterative re-adjustment.

The analysis of the wanted signal may be executed e.g. by detecting the deviation of the signal from a desired value and triggering an alarm signal when a maximum deviation is surpassed. It is however preferred to compare the wanted signal with a reference signal and to indicate the degree of similarity with the reference signal. A "clean" spray stream without background noise may e.g. serve as reference, and the comparison of the wanted signal with this reference shows the deviation from the optimum as degree of similarity. This degree of similarity is an indication for the quality of the spray stream, whereby a surpassing of a limit value for the deviations in frequency or amplitude or generally from a preset pattern tells the operating personal the necessity for replacement of the nozzle. Preferably, the comparison between wanted signal and reference signal is carried out via a cross-correlation function whereby also indefinite values may be outputted to enable an information about the type of spray stream.

According to another feature of the present invention, the comparison between the wanted signal and the reference signal is carried out in a particular frequency spectrum which can be suited precisely to the task at hand and allows a reduced calculation performance to execute a comparison in the critical range. A substantial limitation of the frequency spectrum required for the comparison also reduces the probability of interfering signals from the ambient environment and affords the possibility to omit in certain applications the step of eliminating the interfering signal altogether.

The monitoring process according to the present invention may be advantageously employed in painting plants, especially those using varnish that is particularly difficult to remove, because contamination of an acoustic sensory mechanism will not result in a deterioration of the monitoring function so that the nozzle of the spray gun needs only be replaced when malfunctioning and there is no need to replace the nozzle for preventive purposes. Thus, the nozzle can be replaced in time when indicating a malfunction so that product waste, which otherwise would be experienced by a poor paint job, can be eliminated and the overall process can easily be monitored.

Another useful application of the monitoring process according to the present invention is in conjunction with controlling the emptying process of silo plants. As the noise at the discharge end of the silo corresponds to the amount of content exiting through the outlet, the quantity of the load being discharged and the residual amount remaining in the silo can be determined by the monitoring process according to the present invention, with consideration of the time during which noise is encountered.

BRIEF DESCRIPTION OF THE DRAWING

The above and other objects, features and advantages of the present invention will now be described in more detail with reference to the accompanying drawing, in which.

Figure 1:
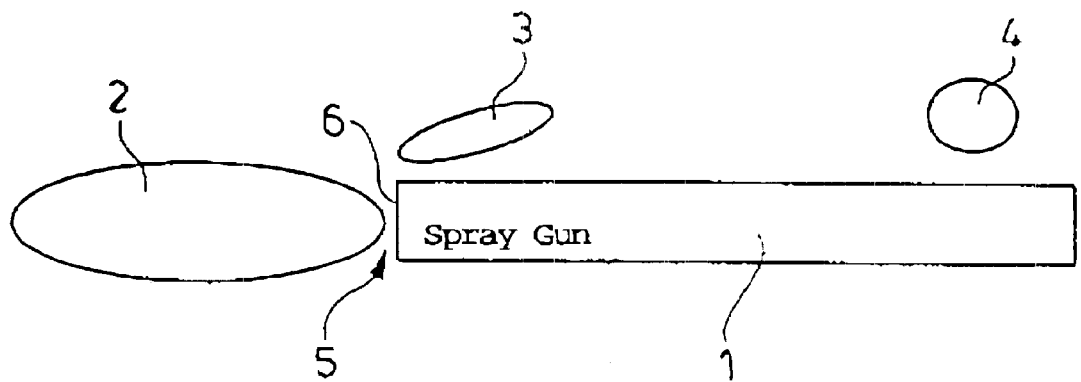
FIG. 1 is a schematic illustration of an arrangement for acoustically monitoring a spray stream in accordance with the present invention; and FIG. 2 is a schematic block diagram for processing measured signals.

DETAILED DESCRIPTION OF PREFERRED EMBODIMENTS

Throughout all the Figures, the same or corresponding elements are generally indicated by the same reference numerals.

Turning now to the drawing, and in particular to FIG. 1, there is shown a schematic illustration of an arrangement for acoustically monitoring a spray stream in accordance with the present invention, including a spray gun 1 provided with a nozzle 6 for discharge of a spray stream 2. Spaced closely to the nozzle 6 in a junction area 5 between the spray gun 1 and the exiting spray stream 2 is a microphone 3 which has a directional characteristic. A second microphone 4 is further position at a distance to the spray stream 2 and has an omnidirectional characteristic. Thus, the microphone 3 in proximity of the spray stream 2 detects primarily noise generated by the spray stream 2 upon exiting the nozzle 6, while the microphone 4 detects primarily unwanted ambient noise.

Turning now to FIG. 2, there is shown a schematic block diagram for processing signals measured by the microphones 3, 4. The microphone 3 which detects noise of spray stream 2 being released from the spray gun 1 is operatively connected to an analog-to-digital converter 9 which changes the registered noise into a first digital output signal 11. The microphone 4 which detects noise generated in a further distant environment of the spray stream 2 is operatively connected to a second analog-to-digital converter 10 which changes the registered ambient noise into a digital output signal 12. The digitized output signals 11, 12 are inputted into a first digital signal processor 13 which computes a wanted signal 14 from both signals 11, 12 by means of a compensation circuit comprised of linear-phased FIR filters and an iterative re-adjustment. Thus, the wanted signal 14 is freed from interfering noise that is not caused by the spray stream 2.

The wanted signal 14 is then inputted into a second digital signal processor 15 and compared with a reference signal e.g. a "clean" spray stream without background noise. The digital signal processor 15 determines via a cross-correlation function the degree of similarity, with the outcome 16 of the determination being outputted for the user and indicating the degree of effectiveness of the spray stream 2.

Persons skilled in the art will understand that even though FIG. 2 shows the provision of two digital signal processors 13, 15, it is certainly within the scope of the present invention to use only a same digital signal processor for executing the compensation circuit as well as the cross correlation, because there is no need to effect a time continuous measurement. For particularly time-critical process monitoring tasks, it is certainly possible to operate with two digital signal processors or with one digital signal processor with particularly high computation performance to effect a continuous or quasi-continuous measurement.

A suitable signal processor is e.g. made available by Motorola Inc., USA, under the designation 62002. Although not shown in detail, the arrangement for carrying out the monitoring process according to the present invention includes a control processor, e.g. made available by the company Siemens AG, Germany, under the designation 5052. The overall costs for realizing the entire arrangement can thus be kept extremely low and correspond approximately to those incurred by conventional light barriers. Moreover, basically no operational costs are incurred by the monitoring process according to the present invention.

While the invention has been illustrated and described as embodied in a process and arrangement of monitoring the effectiveness of a spray stream, it is not intended to be limited to the details shown since various modifications and structural changes may be made without departing in any way from the spirit of the present invention.

What is claimed as new and desired to be protected by Letters Patent is set forth in the appended claims:

1. A process of monitoring the effectiveness of a spray stream; comprising the steps of:

determining a first acoustical signal commensurate with noise generated in proximity of a spray stream discharged from a spray device;

determining a second acoustical signal commensurate with noise detected in an environment at a distance to the spray stream;

digitizing the so determined acoustical signals by transmitting each of the acoustical signals separately to an analog-to-digital converter;

feeding the so digitized signals to a compensation circuit;

separating from the first and second digitized signals a wanted signal; said separating step including the step of forming the wanted signal by means of the compensation circuit; and analyzing the wanted signal for evaluation of the functioning of the spray stream.
Figure 2:
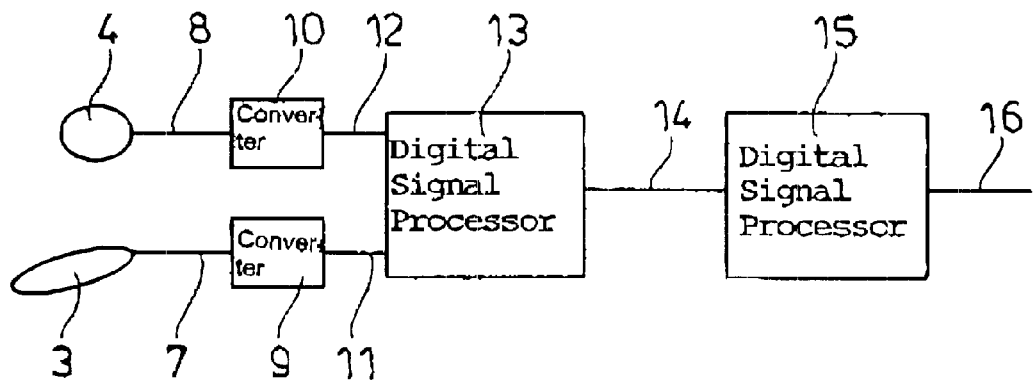

2. The process of claim 1 wherein the analyzing step includes the step of comparing the wanted signal with a reference signal and indicating a degree of similarity with the reference signal.

3. The process of claim 2, wherein the wanted signal is compared with the reference signal at a specific frequency spectrum.

4. The use of a process as defined in claims 1 for monitoring effectiveness of a painting plant.

5. Arrangement for monitoring the effectiveness of a spray stream, comprising:

a first microphone forming a first acoustical signal commensurate with noise generated in proximity of a spray stream being discharged from a spray device;

a second microphone forming a second acoustical signal commensurate with interfering noise generated in an environment further distant to the discharged spray stream;

analog-to-digital converter means operatively connected to the first and second microphones for changing the detected noises into respective first and second digital output signals; and first signal processing means for receiving the first and second digital output signals for computing a wanted signal which is freed from any interfering signal, wherein the signal processing means includes compensation means for computing said wanted signal; and second signal processing means for comparing the wanted signal with a reference signal such that a degree of similarity with the reference signal can be indicated, and wherein the signal processing means includes means for executing a cross correlation function.

6. The arrangement of claim 5 wherein the second signal processor executes the comparison between the wanted signal and the reference signal in a specific frequency spectrum.

7. The arrangement of claim 5, wherein the cross-correlation function for comparing the wanted signal with a reference signal is carried out by the second signal processing means.

* * * * *